(12) United States Patent
Hwang et al.

(10) Patent No.: US 11,860,869 B1
(45) Date of Patent: Jan. 2, 2024

(54) PERFORMING QUERIES TO A CONSISTENT VIEW OF A DATA SET ACROSS QUERY ENGINE TYPES

(71) Applicant: Amazon Technologies, Inc., Seattle, WA (US)

(72) Inventors: Sangyong Hwang, Sammamish, WA (US); Justin Levandoski, Seattle, WA (US); Yongsik Yoon, Sammamish, WA (US); Kamal Kant Gupta, Belmont, CA (US); Saileshwar Krishnamurthy, Palo Alto, CA (US); Ippokratis Pandis, Menlo Park, CA (US); Michail Petropoulos, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 503 days.

(21) Appl. No.: 16/457,154

(22) Filed: Jun. 28, 2019

(51) Int. Cl.
*G06F 16/2453* (2019.01)
*G06F 16/23* (2019.01)
*G06F 16/25* (2019.01)

(52) U.S. Cl.
CPC .... G06F 16/24542 (2019.01); G06F 16/2379 (2019.01); G06F 16/254 (2019.01)

(58) Field of Classification Search
CPC ........... G06F 16/24542; G06F 16/2379; G06F 16/254
See application file for complete search history.

(56) References Cited

U.S. PATENT DOCUMENTS

| | | | |
|---|---|---|---|
| 5,511,190 A | 4/1996 | Sharma et al. | |
| 7,249,118 B2* | 7/2007 | Sandler | G06F 16/2272 |
| 7,657,516 B2 | 2/2010 | Zaman et al. | |
| 8,150,889 B1 | 4/2012 | Bacthavachalu et al. | |
| 8,359,316 B2 | 1/2013 | Franke et al. | |
| 8,825,678 B2 | 9/2014 | Potapov et al. | |
| 9,239,864 B2 | 1/2016 | Krishnamurthy et al. | |
| 9,244,974 B2 | 1/2016 | Muras et al. | |
| 10,621,156 B1 | 4/2020 | Morkel et al. | |
| 10,909,116 B2* | 2/2021 | Chakra | G06F 16/24545 |
| 2003/0229639 A1 | 12/2003 | Carlson et al. | |
| 2007/0130208 A1 | 6/2007 | Bornhoevd et al. | |

(Continued)

OTHER PUBLICATIONS

Makreshanski, Darko, et al. "BatchDB: Efficient isolated execution of hybrid OLTP+ OLAP workloads for interactive applications." Proceedings of the 2017 ACM International Conference on Management of Data. 2017. (Year: 2017).*

(Continued)

*Primary Examiner* — Mohsen Almani
(74) *Attorney, Agent, or Firm* — S. Scott Foster; Kowert, Hood, Munyon, Rankin & Goetzel, P.C.

(57) ABSTRACT

Queries to a consistent view of a data set across different types of query engines are performed. Portions of a query received at a first type of query engine that can be performed at a different type of a query engine can be identified. A consistent view of a data set stored in a common data store can be provided by the first type of query engine to the second query engine. When the different type of query engine performs the portion of the query, the different type of query engine applies the consistent view of the data set. A result for the query can be returned by the first type of query engine based on results from the different type of query engine.

20 Claims, 11 Drawing Sheets

(56) References Cited

U.S. PATENT DOCUMENTS

| | | | |
|---|---|---|---|
| 2009/0254916 A1 | 10/2009 | Bose et al. | |
| 2011/0302164 A1 | 12/2011 | Krishnamurthy et al. | |
| 2013/0275452 A1 | 10/2013 | Krishnamurthy et al. | |
| 2014/0114952 A1 | 4/2014 | Robinson et al. | |
| 2014/0310232 A1 | 10/2014 | Plattner et al. | |
| 2016/0063021 A1 | 3/2016 | Morgan et al. | |
| 2016/0342653 A1 | 11/2016 | Chen et al. | |
| 2017/0004173 A1 | 1/2017 | Simitsis et al. | |
| 2017/0102866 A1 | 4/2017 | Calvillo et al. | |
| 2017/0180567 A1 | 6/2017 | Sharma et al. | |
| 2017/0199910 A1 | 7/2017 | Konik et al. | |
| 2018/0032574 A1 | 2/2018 | Vandenberg | |
| 2018/0046643 A1* | 2/2018 | Brodt | G06F 16/2457 |
| 2019/0087461 A1 | 3/2019 | Hu et al. | |
| 2019/0384759 A1 | 12/2019 | Cappiello et al. | |
| 2020/0201860 A1 | 6/2020 | Vogelsgesang et al. | |
| 2020/0210398 A1* | 7/2020 | Liu | G06F 16/24558 |
| 2020/0295757 A1 | 9/2020 | Choi et al. | |
| 2020/0334254 A1 | 10/2020 | Arye et al. | |
| 2021/0026854 A1* | 1/2021 | Zhou | G06F 16/24542 |

OTHER PUBLICATIONS

Özcan, Fatma, Yuanyuan Tian, and Pinar Tözün. "Hybrid transactional/analytical processing: A survey." Proceedings of the 2017 ACM International Conference on Management of Data. 2017. (Year: 2017).*

Thant, Phyo Thandar, and Thinn Thu Naing. "Hybrid Query Processing System (HQPS) for Heterogeneous Database (Relational and NoSQL)." Proceeding of the International Conference on Computer Networks and Information Technology. 2014. (Year: 2014).*

Kemper, Alfons, and Thomas Neumann. "HyPer: A hybrid OLTP &OLAP main memory database system based on virtual memory snapshots." 2011 IEEE 27th International Conference on Data Engineering. IEEE, 2011. (Year: 2011).*

Cao, Yu, et al. "Es 2: A cloud data storage system for supporting both oltp and olap." 2011 IEEE 27th International Conference on Data Engineering. IEEE, 2011.*

Coelho, Fábio, et al. "Htapbench: Hybrid transactional and analytical processing benchmark." Proceedings of the 8th ACM/SPEC on International Conference on Performance Engineering. 2017.*

Giceva, Jana, and Mohammad Sadoghi. "Hybrid OLTP and OLAP." (2019): 1-8.*

Lang, Harald, et al. "Data blocks: Hybrid OLTP and OLAP on compressed storage using both vectorization and compilation." Proceedings of the 2016 International Conference on Management of Data. 2016.*

Mühlbauer, Tobias, et al. "ScyPer: Elastic OLAP throughput on transactional data." Proceedings of the Second Workshop on Data Analytics in the Cloud. 2013.*

Zhang, Hao, et al. "In-memory big data management and processing: A survey." IEEE Transactions on Knowledge and Data Engineering 27.7 (2015): 1920-1948.*

U.S. Appl. No. 15/918,965, filed Mar. 12, 2018, Gopi Krishna Attaluri, et al.

U.S. Appl. No. 17/116,923, filed Dec. 9, 2020, Shriram Sridharan et al.

U.S. Appl. No. 16/457,122, filed Jun. 28, 2019, Sangyong Hwang et al.

* cited by examiner

PERFORMING QUERIES TO A CONSISTENT VIEW OF A DATA SET ACROSS QUERY ENGINE TYPES

BACKGROUND

Some types of query engines, such as query engines for Online Transaction Processing (OLTP) databases, may be optimized to efficiently perform query workloads that include a large number of updates concurrently. While other types of query engines, such as query engines for Online Analytical Processing (OLAP) databases may be optimized for analytical queries (e.g., queries with "fat" workloads, such as large, grouped aggregate queries). Given the different benefits offered by different types of query engines and the high costs of changing types of query engines, the design of applications dependent on accessing a data set via a chosen query engine may be limited in performance or features that could be obtained if another query engine type were usable to access the data set. Therefore, techniques that allow for utilizing features supported by multiple query engine types to access a data set are highly desirable.

Figure 1:
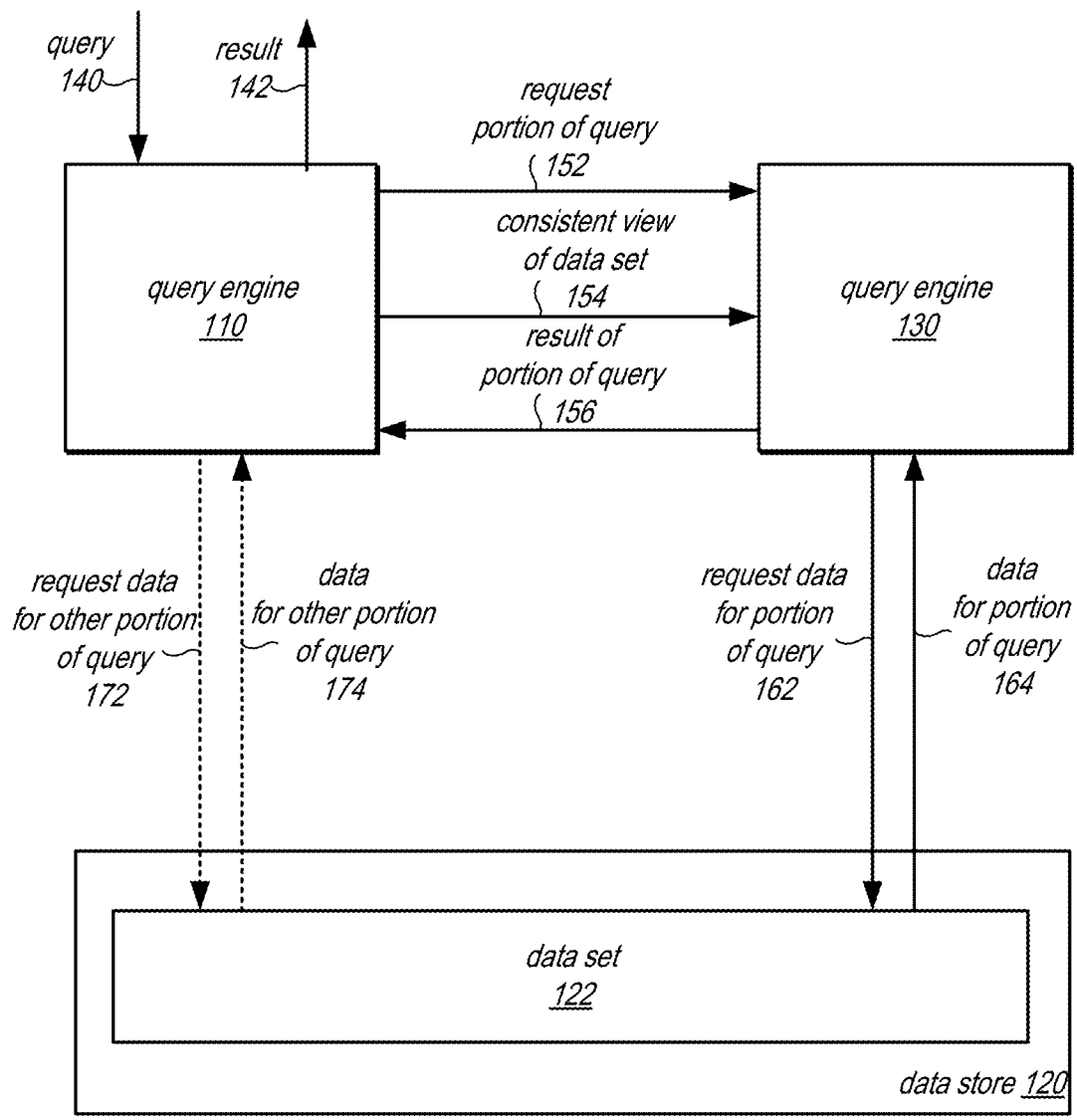
FIG. 1 is a logical block diagram illustrating performing queries to a consistent data set across query engine types, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for performing queries to a consistent data set across query engine types are described. Data sets are often stored in systems and/or formats that are accessible to a specific database engine (or specific database engine type). For instance, OLTP database data may be stored in row-oriented format, to enable OLTP type query engines to perform efficient updates to records or insertions of new data. OLAP database data, however, may be stored in a different format, column-oriented format, to efficiently perform a query across multiple values from many records over a single column. In scenarios where a data set were stored and accessible via one type of query engine, like OLTP, some of the performance benefits achieved by another query engine, like OLAP, would not be easily available. For example, the data might have to be moved to a new data store to be accessible by the other query engine, and yet, data movement creates many costs that might render such data movement infeasible, such as lagging data freshness, performance overhead costs on exporting the data set (e.g., using features such as MySQL's binlog replication technique), and the management or overhead of implementing and maintaining a system to facilitate data movement.

In various embodiments, performing queries to a consistent data set across query engine types can avoid or remove the high costs of switching between types of query engines, improving the performance of client applications by utilizing for the client applications the different, optimized features of different types of query engines (e.g., by providing a significant increase in the performance of OLAP style queries to a data set stored for an OLTP database). For example, performing queries across query engine types may include applying automatic transactional consistency between different query engines (e.g., without implementing a data movement plan that has to maintain consistency between two copies of a data set stored for different query engines). Instead of utilizing multiple copies of a data set (e.g., moved according to the data movement plan), a single, common copy of the data set may be accessed by both query engines, which may ensure that either query engine is operating upon the freshest data (and removing the lag when copying between multiple copies of a data set). In some embodiments, a common interface or endpoint may support queries for different types of query engines, simplifying client application development.

FIG. 1 is a logical block diagram illustrating performing queries to a consistent data set across query engine types, according to some embodiments. Different types of query engines, such as query engine 110 and query engine 130, may receive, parse, plan, and execute queries against data set 122. For example, query engine 110 may be a query engine for a relational database and query engine 130 may be a type of query engine for a non-relational (e.g., NoSQL) database. Both query engine 110 and query engine 130 may access the same copy of data set 122 stored in data store 120. However, in some embodiments, the format of data set 122 in data store 120 may be optimized for one of the types of query engines (e.g., for query engine 110).

Performing queries to a consistent data set across query engine types may allow for one query engine to plan and request a query from another query engine. For example, in FIG. 1, query engine 110 may receive query 140 and generate an initial plan to perform query 140 (as discussed below with regard to FIGS. 5, 6, and 9). Query engine 110 may then apply one or more cross-type optimization rules to identify a portion (or all) of query 140 that could be optimally performed by another type of query engine, query engine 130. Query engine 110 may then send a request 152 to query engine 130 to perform the portion of the query (e.g., a query formulated in a query language supported by query engine 130). Additionally query engine 110 may provide a consistent view 154 of data set 122 to query engine 130 in order to perform the portion of the query—as query engine 110 may also support multiple concurrent updates or transactions to data 122 in addition to receiving and performing query 140. For example, query engine 110 may provide undo log records that can be applied to return item values from data set 122 to a prior state that is consistent with the view of data set 122 being queried. In some embodiments, data store 120 could receive an indication from query engine 110 of the consistent view so that data store 120 could send data 164 to query engine 130 that is within the consistent view (e.g., by first applying one or more undo log records, which may also be stored as part of data set 122, in order to generate a new value of items included in the returned portion 164).

Query engine 130 may request 162 and receive 164 data for the portion of the query from data store 120. Query engine 130 may, in some embodiments, utilize a separate computing layer, tier or service from query engine 130 to obtain data from data set 122, which may also perform further optimizations such as reformatting the obtained data into a format optimized for query engine 130 (e.g., instead of the present format optimized for query engine 110). Although not depicted in FIG. 1, query engine 130 may utilize other copies of data set 122 stored in other locations (e.g., other data stores) in addition to data store 120, and thus may perform a query across different data stores (as well as query engine types), as discussed below with regard to FIGS. 4 and 7. Data from other data sets (e.g., only accessible by query engine 130 and not query engine 110) could be accessed and/or included in a result 142 of query 140, in some embodiments.

Query engine 130 may return a result 156 of the portion of the query to query engine 110, in some embodiments. Query engine 110 may then provide the result 142 based on the portion result 156 as a stand alone result (e.g., in scenarios where all of the query was performed by query engine 130) or in combination with results obtained as a result of query engine 110 executing another portion of query 140. For example, query engine 110 may request and receive data for another portion of the query to obtain results for query 140 and incorporate or analyze these results with the result 156 obtained from query engine 130 before sending a final result 142.

Please note, FIG. 1 is provided as a logical illustration of query engines, a data store, and respective interactions and is not intended to be limiting as to the physical arrangement, size, or number of components, modules, or devices to implement such features. Also note that in some embodiments, a different query could be sent directly to query engine 130, which could perform a query to data set 122 in data store 120 with a request sent to query engine 110, or query engine 130 could implement similar features to those of query engine 110 to perform cross type optimization and send a portion of a query to query engine 110 for execution.

The specification first describes an example of a provider network that may implement different query engines as part of different network-based services, according to various embodiments. Included in the description of the example network-based services to perform queries to a consistent data set across query engine types implemented in the different services. The specification then describes a flowchart of various embodiments of methods for performing queries to a consistent data set across query engine types. Next, the specification describes an example system that may implement the disclosed techniques. Various examples are provided throughout the specification.

Figure 2:
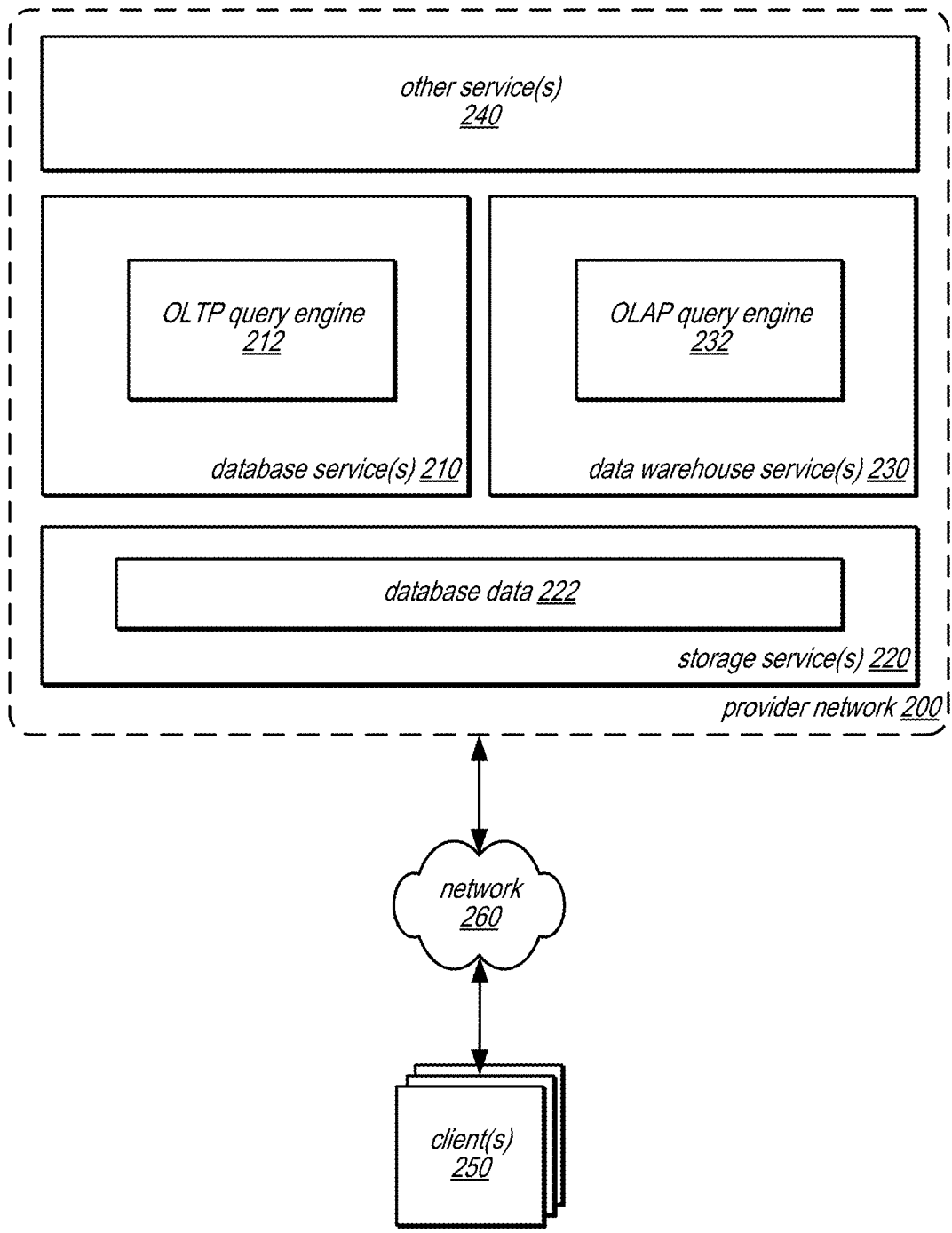
FIG. 2 is a block diagram illustrating a provider network offering network-based services implementing different query engine types that can perform queries to a consistent data set across the query engine types, according to some embodiments.

FIG. 2 is a block diagram illustrating a provider network offering network-based services implementing different query engine types that can perform queries to a consistent data set across the query engine types, according to some embodiments. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and services offered by the provider network 200.

In some embodiments, provider network 200 may implement various network-based services, including database service(s) 210, a storage service(s) 220, data warehouse service(s) 230 and/or one or more other virtual computing services 240 (which may include various other types of storage, processing, analysis, communication, event handling, visualization, and security services). Database service(s) 210 may implement various types of database systems and formats (e.g., relational, non-relational, graph, document, time series, etc.) and the respective types of query engines to perform queries to those databases. For example, database service(s) 210 may implement an OLTP query engine 212 to provide fast and efficient transaction processing for a relational database stored as database data 222 in storage service(s) 210. Data warehouse service(s) 230 may implement various types of data warehouses that support various kinds of analytics and other data processing, such as OLAP query engine 232. Storage service(s) 220 may include many different types of data stores, including a log-structured storage service and object storage service as discussed below with regard to FIGS. 3 and 4, in some embodiments.

Clients 250 may access these various services offered by provider network 200 via network 260. Likewise network-based services may themselves communicate and/or make use of one another to provide different services. For example, storage service 220 may store data 222 for databases managed by database service 210, in some embodiments. It is noted that where one or more instances of a given component may exist, reference to that component herein may be made in either the singular or the plural. However, usage of either form is not intended to preclude the other In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to execute a transaction or query with respect to a database, a request to manage a database, such as a request to enable or disable performing queries across different types of query engines, etc.). For example, a given client 250 may include a suitable version of a web browser, or may include a plug-in module or other type of code module that can execute as an extension to or within an execution environment provided by a web browser. Alternatively, a client 250 (e.g., a database service client) may encompass an application, a web server, a media application, an office application or any other application that may make use of provider network 200 to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with network-based services platform 200. In some embodiments, client 250 may generate network-based services requests according to a Representational State Transfer (REST)-style network-based services architecture, a document- or message-based network-based services architecture, or another suitable network-based services architecture.

In some embodiments, a client 250 (e.g., a database service or data warehouse service client) may provide access to a database hosted in database service 210 or data warehouse hosted in data warehouse service 230 to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders, in one embodiment. In such an embodiment, applications may not need to be modified to make use of the storage system service model. Instead, the details of interfacing to provider network 200 may be coordinated by client 250 and the operating system or file system on behalf of applications executing within the operating system environment. In some embodiments, clients of database service(s) 210, data warehouse service(s) 230, and storage service(s) 220 may be other systems, components, or devices implemented as part of or internal to provider network 200 (e.g., a virtual machine or other compute instance hosted as part of a virtual computing service may act as a client application of database service(s) 210 and data warehouse service(s) 230).

Client(s) 250 may convey network-based services requests (e.g., a request to query a database) to and receive responses from services implemented as part of provider network 200 via network 260, in some embodiments. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In such a case, clients 250 may communicate with provider network 200 entirely through a private network (e.g., a LAN or WAN that may use Internet-based communication protocols but which is not publicly accessible).

Services within provider network 200 (or provider network 200 itself) may implement one or more service endpoints to receive and process network-based services requests, such as requests to access data pages (or records thereof), in various embodiments. For example, provider network 200 services may include hardware and/or software to implement a particular endpoint, such that an HTTP-based network-based services request directed to that endpoint is properly received and processed, in one embodiment. In one embodiment, provider network 200 services may be implemented as a server system to receive network-based services requests from clients 250 and to forward them to components of a system within database service 210, storage service 220 and/or another virtual computing service 230 for processing.

In some embodiments, provider network 200 (or the services of provider network 200 individually) may implement various user management features. For example, provider network 200 may coordinate the metering and accounting of user usage of network-based services, including storage resources, such as by tracking the identities of requesting clients 250, the number and/or frequency of client requests, the size of data tables (or records thereof) stored or retrieved on behalf of user, overall storage bandwidth used by users or clients 250, class of storage requested by users or clients 250, or any other measurable user or client usage parameter, in one embodiment. In one embodiment, provider network 200 may also implement financial accounting and billing systems, or may maintain a database of usage data that may be queried and processed by external systems for reporting and billing of client usage activity. In some embodiments, provider network 200 may be to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or data warehouse service 230 (or the underlying systems that implement those services).

In some embodiments, provider network 200 may also implement user authentication and access control procedures. For example, for a given network-based services request to access a particular database, provider network 200 may implement administrative or request processing components that may ascertain whether the client 250 associated with the request is authorized to access the particular database. Provider network 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, provider network 200 may reject the corresponding network-based services request, for example by returning a response to the requesting client 250 indicating an error condition, in one embodiment. Various access control policies may be stored as records or lists of access control information by database service 210, storage service 220 and/or other virtual computing services 230, in one embodiment.

Figure 3:
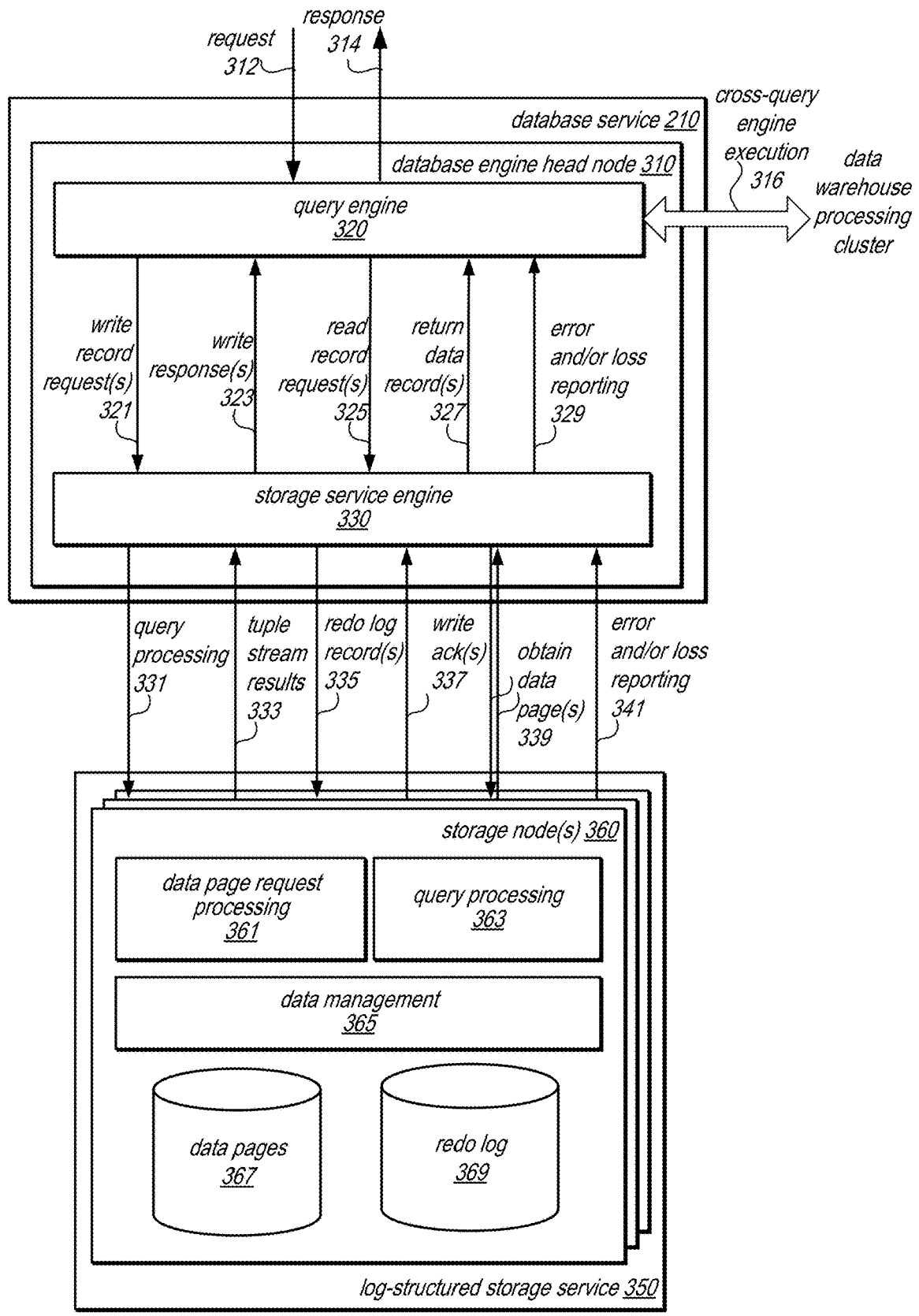
FIG. 3 is a block diagram illustrating various components of database service implementing a query engine type that supports queries across query engine types, according to some embodiments.

FIG. 3 is a block diagram illustrating various components of database service implementing a query engine type that supports queries across query engine types, according to some embodiments. Database service 210 may implement one or more different types of database systems (e.g., a database instance) with respective types of query engines for accessing database data as part of the database. In the example database system implemented as part of database service 210, a database engine head node 310 may be implemented for each of several databases and a log-structured storage service 350 (which may or may not be visible to the clients of the database system). Clients of a database may access a database head node 310 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a database engine head node 310.

Figure 6:
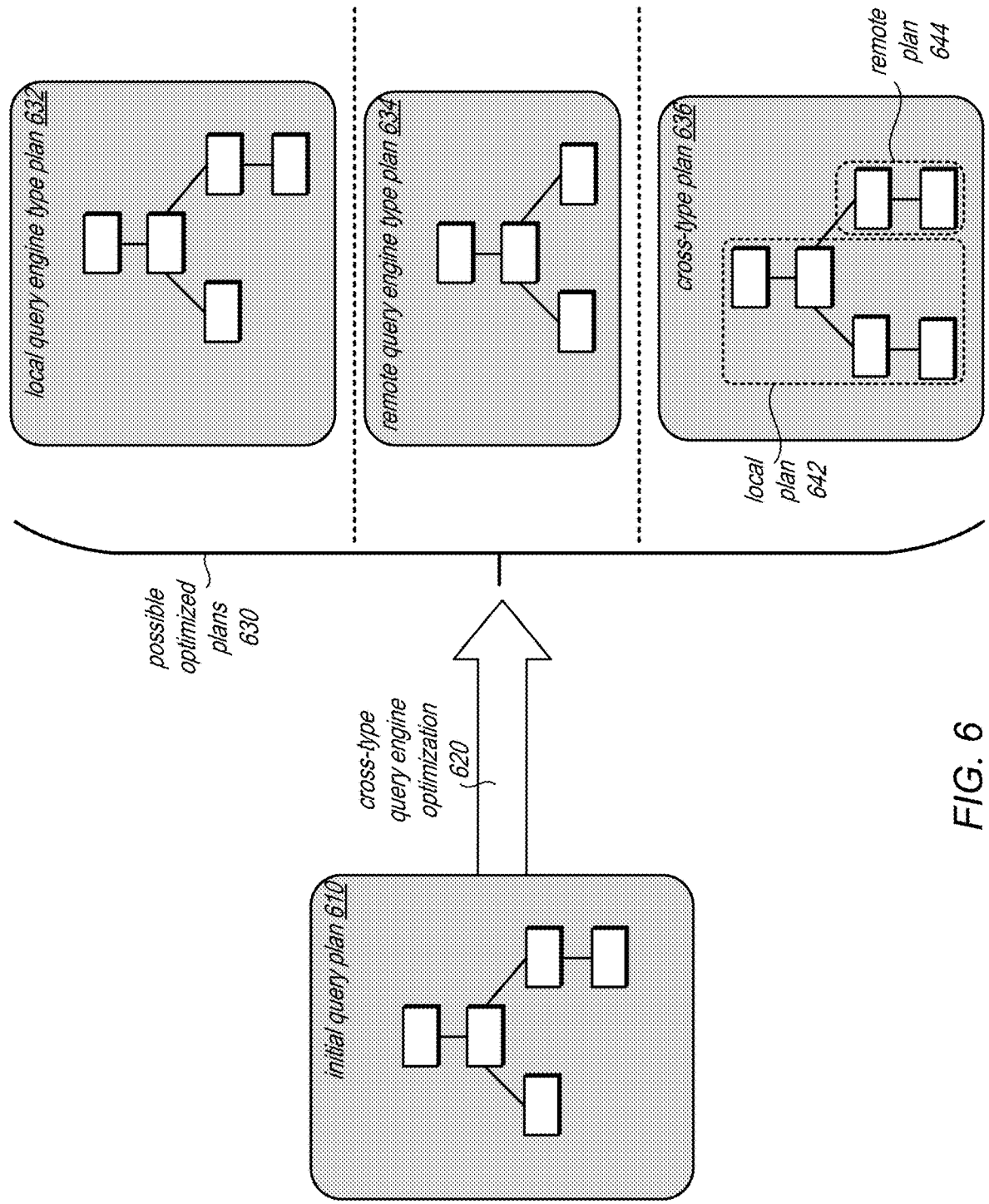
FIG. 6 is a block diagram illustrating possible cross-type query engine plan optimizations, according to some embodiments.

A database hosted in database service 210 may include a single database engine head node 310 that implements a query engine 320 that receives requests, like request 312, which may include queries or other requests such as updates, deletions, etc., from various client programs (e.g., applications) and/or subscribers (users), then parses them, optimizes them, and develops a plan to carry out the associated database operation(s), such as the plan discussed below with regard to FIG. 6. Query engine 320 may return a response 314 to the request (e.g., results to a query) to a database client, which may include write acknowledgements, requested data pages (or portions thereof), error messages, and or other responses, as appropriate. As illustrated in this example, database engine head node 310 may also include a storage service engine 330 (or client-side driver), which may route read requests and/or redo log records to various storage nodes within log-structured storage service 350, receive write acknowledgements from log-structured storage service 350, receive requested data pages from log-structured storage service 350, and/or return data pages, error messages, or other responses to query engine 320 (which may, in turn, return them to a database client).

In this example, query engine 320, or another database system management component implemented at database engine head node 310 (not illustrated) may manage a data page cache, in which data pages that were recently accessed may be temporarily held. Query engine 320 may be responsible for providing transactionality and consistency in the database instance of which database engine head node 310 is a component. For example, this component may be responsible for ensuring the Atomicity, Consistency, and Isolation properties of the database instance and the transactions that are directed to the database instance, such as determining a consistent view of the database applicable for a query, applying undo log records to generate prior versions of tuples of a database from dirty tuples received from storage nodes, as discussed below, or providing undo or other consistency information to another query engine, as discussed below with regard to FIG. 5. As illustrated in FIG. 3, query engine 320 may manage an undo log to track the status of various transactions and roll back any locally cached results of transactions that do not commit.

As illustrated in FIG. 3, query engine 320 may manage an undo log to track the status of various transactions and roll back any locally cached results of transactions that do not commit.

FIG. 3 illustrates various interactions to perform various requests, like request 312. For example, a request 312 that includes a request to write to a page may be parsed and optimized to generate one or more write record requests 321, which may be sent to storage service engine 330 for subsequent routing to log-structured storage service 350. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) to database engine head node 310 (specifically to storage service engine 330). Storage service engine 330 may pass these write acknowledgements to database tier components 560 (as write responses 323), which may then send corresponding responses (e.g., write acknowledgements) to one or more client clients as a response 314.

In another example, a request that is a query may cause data pages to be read and returned to query engine 320 for evaluation and processing or a request to perform query processing at log-structured storage service 350 may be performed. For example, a query could cause one or more read record requests 325, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339 to database engine head node 310 (specifically to storage service engine 330). Storage service engine 330 may send the returned data pages to query engine 320 as return data records 327, and query engine may then evaluate the content of the data pages in order to determine or a generate a result of a query sent as a response 314.

In another example, a request 312 that is a query may cause computations associated with query processing 331 may be sent to the storage nodes 360 for processing (e.g., the processing may be distributed across the storage nodes). As illustrated, results from the processing (e.g., in the form of tuple stream results 333) may be provided back the database engine, in embodiments. For instance, query processing requests 331 may uses the message passing framework of storage service engine 330. In some embodiments, all communication may be initialized from the storage service engine 330. In some embodiments, communication may not be initialized from the storage node side. In some embodiments, storage service engine 330 may use a "long poll" mechanism for creating a storage level query processing session (e.g., for performing parallel query processing across multiple storage nodes) for each query processing operation 331 sent, in some embodiments. In some embodiments, the same message framework may be used for receiving periodic progress updates (e.g., heart-beats) from each storage node while the query is being processed (not illustrated in FIG. 3). In some embodiments, a storage node 360 may notify the query engine 320 when query processing (e.g., on a batch) has been completed, for example, providing a handle that the query engine can use to pull the results from storage nodes 360. In some embodiments, the flow control may be implemented on the head node side. In some embodiments, the message format may implement a header containing control metadata, and data (rows/tuples) sent as raw data.

If a storage node fails (this may include less-than-complete failures, e.g. a process failure for query processing), the corresponding request (e.g., to process a batch of pages or tuples) may be resubmitted to another storage node that stores the data (e.g., a full segment from the same protection group (PG)). In another example, if a previous storage node fails while transmitting the tuple stream results 333 back to the head node 310, the head node 310 may keep the results already received, and only transfer the remainder from the new storage node, in some embodiments. In such embodiments, storage nodes 360 may provide results in a deterministic order, in some embodiments. In some embodiments, it may be tolerable for data to be processed in any order convenient and/or in parallel. In some embodiments, storage nodes 360 may spill results to persistent storage if, for example, a memory buffer for results becomes full, while in other embodiments that cannot spill results to persistent storage processing may pause until further results can be fit in storage (or the process may be aborted).

In some embodiments, various error and/or data loss messages 341 may be sent from log-structured storage service 350 to database engine head node 310 (specifically to storage service engine 330). These messages may be passed from storage service engine 330 to query engine 320 as error and/or loss reporting messages 329, and then to one or more clients as a response 314.

In some embodiments, the APIs 331-341 of log-structured storage service 350 and the APIs 321-329 of storage service engine 330 may expose the functionality of the log-structured storage service 350 to database engine head node 310 as if database engine head node 310 were a client of log-structured storage service 350. For example, database engine head node 310 (through storage service engine 330) may write redo log records or request data pages through these APIs to perform (or facilitate the performance of) various operations of the database system implemented by the combination of database engine head node 310 and log-structured storage service 350 (e.g., storage, access, change logging, recovery, and/or space management operations).

Note that in various embodiments, the API calls and responses between database engine head node 310 and log-structured storage service 350 (e.g., APIs 321-329) and/or the API calls and responses between storage service engine 330 and query engine 320 (e.g., APIs 331-341) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 310 and/or log-structured storage service 350.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, query processing 363, and data management 365 to implement various ones of these features with regard to the data pages 367 and redo log 369 among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment), and in some instances, the application of undo log records generated to reverse or otherwise undo the effect of a transaction's change to item values in order to provide tuple stream results 333 or data pages 339 within a consistent view (e.g., pages with an LSN of an update applied to the page or item less than a logical sequence number indicated as the LSN associated with the consistent view). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages responsive to be returned responsive to a request. Query processing 363 may handle requests to return values from a database (e.g., tuples) with various query processing operations applied before returning the values (e.g., filtering, aggregating, sorting, etc.).

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.). In some embodiments, user-influenced input (query, perhaps in some processed form) and data pages may shift query processing from a single-tenant environment (e.g., a database head node) to a multi-tenant environment (e.g., storage node). In order to provide additional security, query processing 363 may be done in a standalone process, with a software "jail" built around it, using a downgraded security context, seccomp, cgroups, and potentially other hostile code execution mitigation techniques, in embodiments. The attack surface may be minimized by using a minimal subset of query processing code, and performing the initial query parsing on the query engine 320, in some embodiments.

In some embodiments, query processing 363 should not disrupt regular processing of access requests to read or obtain data pages 339 or write redo log records 335. In some embodiments, a process (e.g., a daemon) for query processing may have a hard limit of the memory and CPU footprint, to guard against resource drain, for example. In embodiments, query processing may be performed in a separate address space in order to provide failure isolation. In this way, a bug in query processing 363 would not impact regular page request or management operations (e.g., storing redo log records, returning data pages, coalesce operations, etc.), in some embodiments. Such precautions may isolate memory leaks and runaway resource consumption in general.

Query processing 363 at storage nodes 360 may only process tuples that are known to be safe to process on the storage nodes 360 (e.g., visible to a database query), and send other tuples directly to the head node without processing, in some embodiments.

In embodiments, query processing 363 may be performed in a streaming fashion (e.g., for efficiency). In some embodiments, materialization of query processing results (e.g., in-memory or other storage) may facilitate blocking query operations, like hash partition, sort, and group aggregation (although group aggregation may decomposable so group aggregation operations may not necessarily materialize the entire result). In another example, if the head node is consuming query processing results slowly or unevenly, materialization can be a form of buffering. In yet another example embodiment, materialization on storage nodes can allow storage nodes to complete processing and release or advance garbage collection point in times sooner, without waiting for the head node to consume the entire result. In this way, garbage collection may not be delayed, in some embodiments. In some embodiments, materialization on a storage may coincide with embodiments that ensure cleanup. In embodiments, materialization on the storage node may be part of the existing volume. In other embodiments, materialization may coincide with creation of a new temporary space for storing query processing results.

Figure 4:
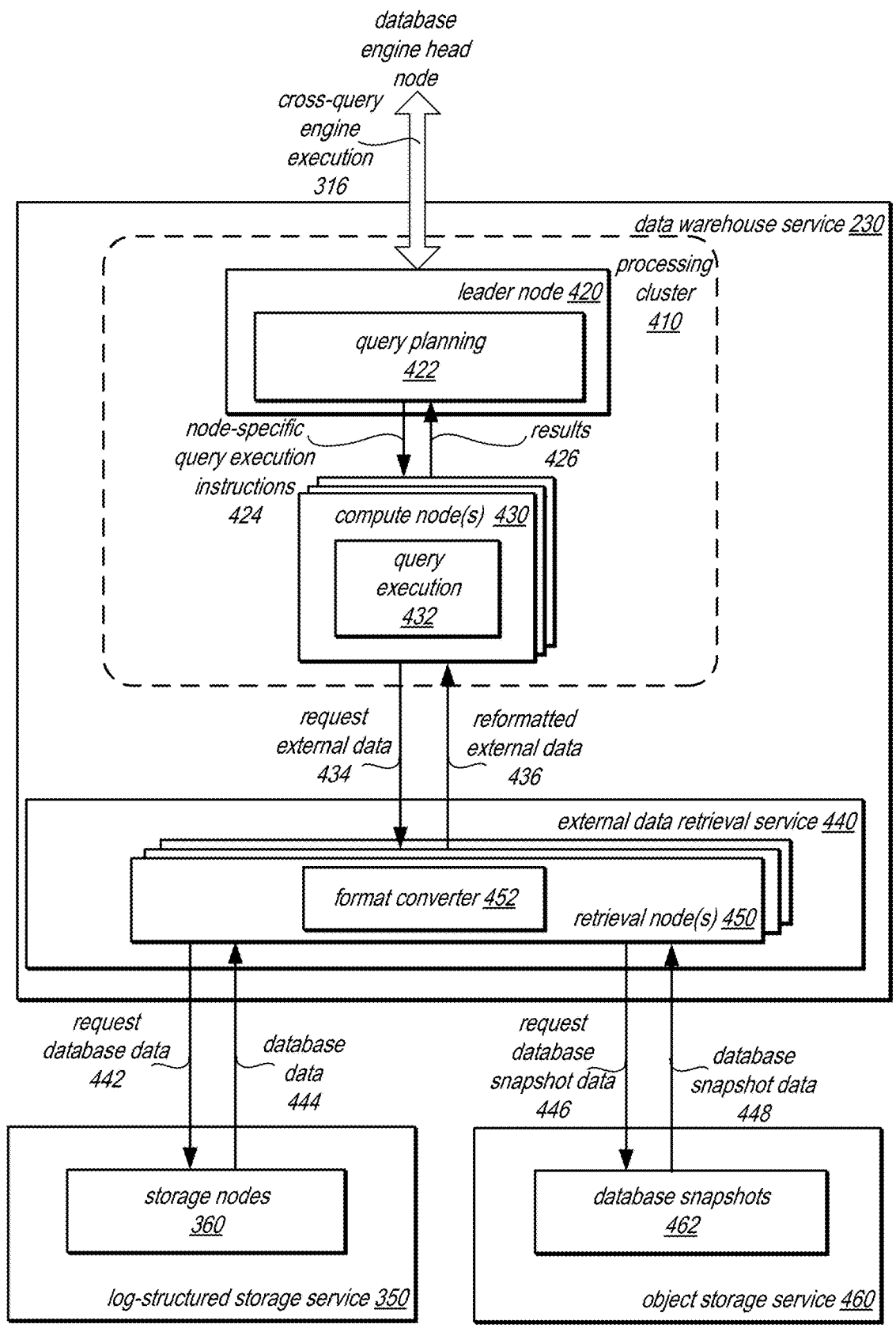
FIG. 4 is a block diagram illustrating a data warehouse service that implements a query engine type that supports queries across query engine types, according to some embodiments.

As discussed above with regard to FIG. 1, queries may be performed across different types of query engines. Thus, query engine 320 of database engine head node 310 may perform cross-query engine execution 316 another query engine, such as another query engine in another service like a data warehouse processing cluster. FIG. 4 is a block diagram illustrating a data warehouse service that implements a query engine type that supports queries across query engine types, according to some embodiments.

FIG. 4 is a block diagram illustrating a data warehouse service that implements a query engine type that supports queries across query engine types, according to some embodiments. Processing cluster 410 may be data warehouse service cluster that distributes execution of a query among multiple processing nodes (e.g., to implement an OLAP engine as discussed above with regard to FIG. 2). As illustrated in this example, a processing cluster 410 may include a leader node 420 and compute nodes 430, which may communicate with each other over a network (not illustrated). Leader node 420 may implement query planning 422 to generate query plan(s) and instructions 424 for executing queries on processing cluster 410 that perform data processing on local data (not illustrated) stored on attached storage and can utilize remote query processing resources for remotely stored data, such as database data stored for another query engine like a database engine head node 310 in FIG. 3.

Note that in at least some embodiments, query processing capability may be separated from compute nodes, and thus in some embodiments, additional components may be implemented for processing queries. Additionally, it may be that in some embodiments, no one node in processing cluster 410 is a leader node as illustrated in FIG. 4, but rather different nodes of the nodes in processing cluster 410 may act as a leader node or otherwise direct processing of queries to data stored in processing cluster 410. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 410 may be implemented as part of a data warehouse service 230, as discussed above with regard to FIG. 2. Leader node 420 may manage communications with clients, which may be external clients (e.g., clients 250) or internal clients within provider network 200, which may include a database engine head node performing cross-query engine execution 316. For example, leader node 420 may be a server that receives a query from various client programs (e.g., database engine head node or other applications) and/or subscribers (users), then parses them and develops an execution plan (e.g., query plan(s)) to carry out the associated database operation(s)). The query may be directed to data that is stored locally within processing cluster 410 (e.g., at one or more of compute nodes 430), data stored remotely (which may be accessible by external data retrieval service 440), and/or both local and external data.

Leader node 420 may also manage the communications among compute nodes 430 instructed to carry out database operations for data stored in the processing cluster 410 (or data being processed by processing cluster 410). For example, node-specific query instructions 424 may be generated or compiled code that is distributed by leader node 420 to various ones of the compute nodes 430 to carry out the steps needed to perform a query, including executing the code to generate intermediate results of the query at individual compute nodes that may be sent back to the leader node 420. Leader node 420 may receive data and query responses or results from compute nodes 430 in order to determine a final result for a query. A database schema, data format and/or other metadata information for the data stored among the compute nodes, such as the data tables stored in the cluster, may be managed and stored by leader node 420. Query planning 422 may account for remotely stored data by generating node-specific query instructions that include remote operations to be directed by individual compute node(s) 430.

Processing cluster 410 may also include compute nodes 430. Compute nodes 430, may for example, be implemented on servers or other computing devices, such as those described below with regard to computer system 2000 in FIG. 11, and each may include individual query processing "slices" defined, for example, for each core of a server's multi-core processor, including query execution 432 to execute the instructions 424 or otherwise perform the portions of the query plan assigned to the compute node. Query execution 432 may access a certain memory and disk space in order to process a portion of the workload for a query (or other database operation) that is sent to one or more of the compute nodes 430. Query execution may access attached storage to perform local operation(s) (not illustrated). For example, query execution 432 may scan data in attached storage, access indexes, perform joins, semi joins, aggregations, or any other processing operation assigned to the compute node 430 (similar operations could be applied to external data).

Attached storage for a compute node 430 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Query planning 422 may also direct the execution of remote data processing operations, by providing remote operations to query execution 432. Query execution 432 may be implemented by a client library, plugin, driver or other component that sends requests for external data 434 to data retrieval service 440. In some embodiments, data retrieval service 440 may implement a common network endpoint to which requests 434 are directed, and then may dispatch the requests to respective retrieval nodes 450. Query execution 432 may read, process, or otherwise obtain reformatted external data 436 from processing nodes 450, formatted by format converter 452 to a data format for processing cluster 410 (e.g., converting data from row oriented to column oriented format). Other operations may be applied by retrieval nodes 450 for external data, such aggregation operations or filtering operations) performed upon retrieved data and returned 436.

Compute nodes 430 may send intermediate results from queries back to leader node 420 for final result generation (e.g., combining, aggregating, modifying, joining, etc.). Query execution 432 may retry external data requests 434 that do not return within a retry threshold. As external data retrieval service 440 may be stateless, processing operation failures at retrieval node(s) 450 may not be recovered or taken over by other retrieval nodes 450, query execution 432 may track the success or failure of requested external data 434, and perform retries when needed.

External data retrieval service 440 may receive requests to retrieve data stored in another storage service in order to provide that for performing a query within processing cluster 410, such as database data stored in log-structured storage service 350 at various storage nodes 360 or database snapshots 462 stored in object storage service 460. Retrieval requests may be received from a client, such as requests for external data 434, and handle among one or multiple retrieval node(s) 450. In some embodiments, data from other databases, tables, warehouses, etc. may be retrieved by external data retrieval service 440 that is not part of a database stored in storage nodes 360 or snapshots 462 but which may be included in a result for cross-query engine execution 316. In some embodiments, data warehouse service 230 may generate query results by performing external data requests 434 and then storing the final result generated by leader node 420 as a migrated result set stored in another data store (e.g., not illustrated).

Figure 11:
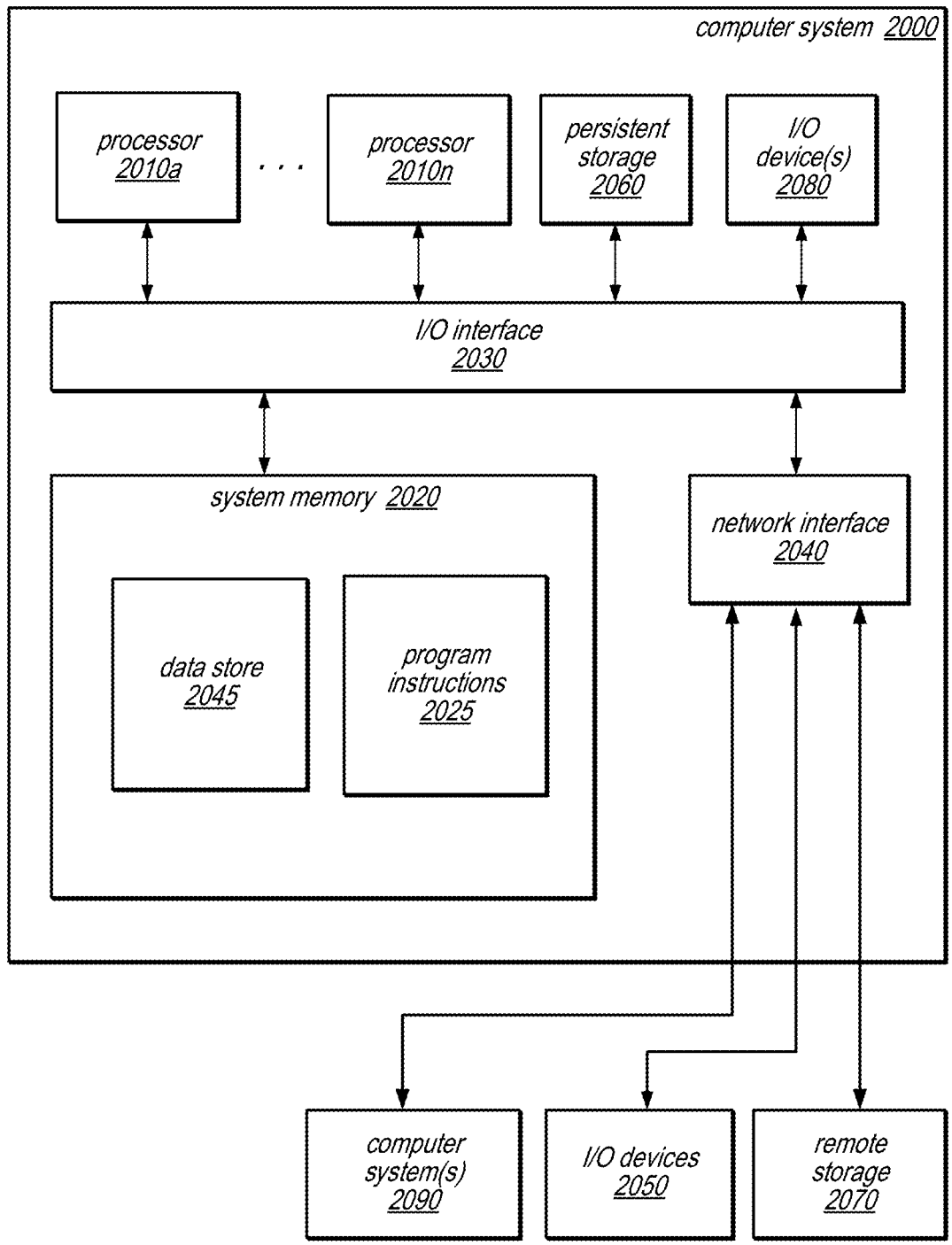
FIG. 11 is a block diagram illustrating a computer system that may implement at least a portion of systems described herein, according to some embodiments.

Retrieval node(s) 450 may be implemented as separate computing nodes, servers, or devices, such as computing systems 2000 in FIG. 11, to perform data processing operations on behalf of clients, like compute nodes 430. Retrieval node(s) 450 may implement stateless, in-memory processing to execute retrieval and other data processing operations, in some embodiments. In this way, retrieval node(s) 450 may have fast data processing rates. Retrieval node(s) 450 may implement client authentication/identification to determine whether a client has the right to access external data in a storage service. For example, client authentication/identification may evaluate access credentials, such as a username and password, token, or other identity indicator by attempting to connect with a storage service using the provided access credentials. If the connection attempt is unsuccessful, then the data processing node may send an error indication to remote data processing client.

Retrieval node(s) 450 may implement query processing 422 or other features of a query engine which may perform multiple different processing operations in addition to retrieving the data from external sources and support multiple different data formats. For example, query processing 422 may implement separate tuple scanners for each data format which may be used to perform scan operations that scan data and which may filter or project from the scanned data, search (e.g., using a regular expression) or sort (e.g., using a defined sort order) the scanned data, aggregate values in the scanned data (e.g., count, minimum value, maximum value, and summation), and/or group by or limit results in the scanned data. Requests for external data may include an indication of the data format for data so that retrieval node(s) 450 may use the corresponding tuple scanner for data. Retrieval node(s) 450 may, in some embodiments, transform results of operations into a different data format or schema according to a specified output data format in the external data request.

In some embodiments, external data may be stored in encrypted or compressed format. Retrieval node(s) 450 may implement compression engine(s) to decompress data according to a compression technique identified for data, such as lossless compression techniques like run-length encoding, Lempel-Ziv based encoding, or bzip based encoding. Retrieval node(s) 450 may implement encryption engine(s) to decrypt data according to an encryption technique and/or encryption credential, such as a key, identified for data, such as symmetric key or public-private key encryption techniques.

Retrieval node(s) 450 may implement storage access to format, generate, send and receive requests to access data in storage service 350 (e.g. a feature or interface similar to storage service engine 330 in FIG. 3). For example, retrieval nodes may generate requests to obtain data according to a programmatic interface for log-structured storage service 350 at storage nodes 360, such as a request for database data 442 to receive database data 444, or object storage service 460, such as a request for database snapshot data 446 and receive database snapshot data 448. In some embodiments, other storage access protocols, such as internet small computer interface (iSCSI), may be implemented to access data.

In various embodiments, retrieval nodes 450 may obtain database volume mapping information to request data pages or send query processing requests to obtain tuple streams according to the appropriate storage nodes 360 identified by the mapping data.

Figure 5:
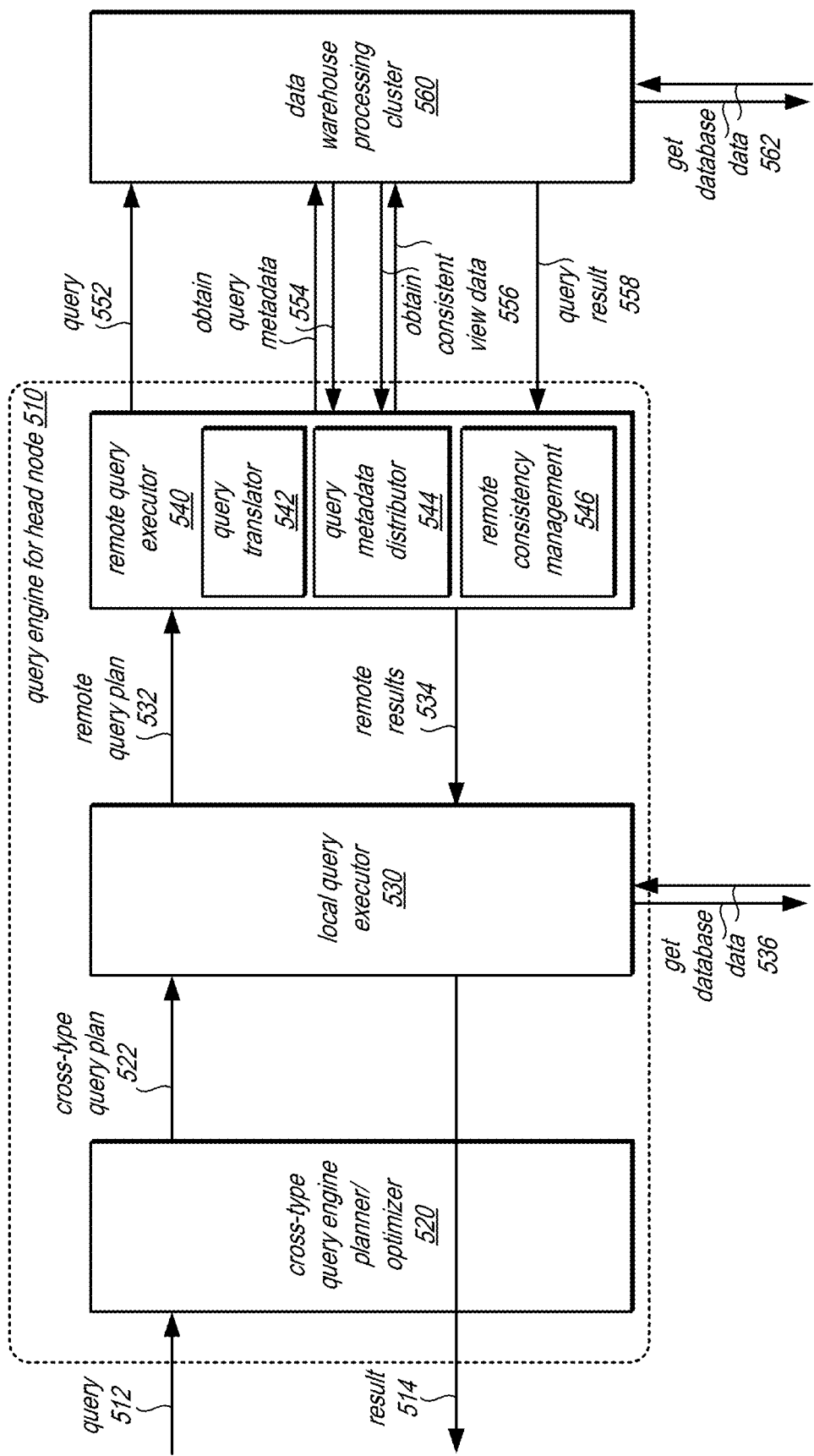
FIG. 5 is a block diagram illustrating cross-type query engine planning and execution, according to some embodiments.

Cross-query engine execution 316 may be implemented between database engine head nodes and data warehouse processing clusters discussed above. In order to coordinate the performance of such queries, planning techniques to identify and optimize the operations performed by each query engine (if any) may be implemented. FIG. 5 is a block diagram illustrating cross-type query engine planning and execution, according to some embodiments.

A query engine 510 for a database engine head node may implement cross-type query engine planner/optimizer 520. When a query is received, one or more cross-type optimization rules may be applied to identify portions (or all) of a query that could be performed by data warehouse processing cluster (e.g., according to the techniques discussed below with regard to FIG. 6 and FIG. 8). For example, size classifiers may be applied to determine whether a query is likely to run longer than a threshold value. In some embodiments, query features may indicate which type of query engine is capable of supporting the claimed features (e.g., analytics features (or features performed faster/more efficiently by analytics engines) may be handled by an OLAP style query engine, such as a data warehouse processing cluster such as correlated subqueries). Hints or other indicators may be included in the query that identify which type of query engine should handle that portion (or all) of the query, in some embodiments. Query engine planner/optimizer 520 may be able to switch to a single query engine mode, in some embodiments, to generate a plan for a query (e.g., in the event that a previously generated cross-type query engine plan failed) in order to perform a query, in some embodiments.

A cross-type query plan 522 may be provided to local query executor 530. Local query executor 530 may interpret or generate instructions to perform the plan, and direct the performance of the plan. For example, for portions of the cross type plan that are remotely performed, local query executor 530 may provide a portion that is the remote query plan 532 (or instructions to implement the remote query plan) to remote query executor 540. Local query executor 530 also perform instructions to execute any portion of the cross-type query plan that is performed at query engine 510, by performing various requests to get database data (e.g., as discussed above with regard to requests between a query engine 320, storage service engine 330, and log-structured storage service 350 in FIG. 3). Local query executor 530 may also combine, integrate, or otherwise evaluate remote results 534 in order to generate a final result 514 sent response to query 512, in some embodiments.

Remote query executor 540 may implement query translator 542 to translate the remote query plan 532 into a query that may be understood by data warehouse processing cluster 560 (e.g., changing query language, syntax, features, parameters, or hints). In some embodiments, query translator 542 may instead implement a query planner for the remote query engine (e.g., data warehouse processing cluster 560) and generate a query plan for that remote query engine—which the remote query engine may accept instead of a query). Remote query executor 540 may submit the query 552 to data warehouse processing cluster 560, which may get database data 562 perform query 552. As discussed in detail below with regard to FIG. 7, some queries may be performed using both data retrieved from the data store of query engine 510 and snapshots of the database which may be consistent with the consistent view identified for the query.

To perform query 552, data warehouse processing cluster 560 may obtain various information or metadata to perform the query 554. In some embodiments, various data and/or metadata may be provided as part of the initial request to perform the query 552. In some embodiments, remote query executor 540 may implement an interface and feature to respond to requests for metadata, such as query metadata distributor 544. For example, such metadata that may be provided may include log sequence numbers (LSN) indicating the consistent view point of the database for the query, storage/head node connection info, schema, available statistics (e.g., data distribution, min max, etc.), projection and filter.

To perform query 552, data warehouse processing cluster 560 may obtain a consistent view 556 of the database data from remote query executor 540. For example, remote consistency management 546 may be implemented to provide consistency information such as undo log records generated when a transaction is performed at the query engine head node in order to undo transactions that are not committed or applied to a database (e.g., because of conflicts with other transactions) or other information that can be used to roll-back, remove, or otherwise undo transactions not visible in an identified view for the query (e.g., determined when the query plan is created). Data warehouse processing cluster 560 may apply the consistency information when retrieved database data needs to be modified in order to be consistent with the view of the database for the query. Results of the query may be returned 534 to local query executor 530. In some embodiments, not illustrated, remote query executor 540 may provide an consistent view indication to log-based storage service 330 so that when requests to get database data 562 are sent from data warehouse processing cluster 560, the log-based storage service 330 may return data with, for example, undo log records applied when a current value is not within the consistent view for a query.

Please note that although the query 512 and planning features are depicted as implemented in database engine head node query engine 510, similar features could be implemented within data warehouse processing cluster 560. For example, a query could be sent to data warehouse processing cluster 560, which may perform query planning and begin execution, obtaining query metadata 554 and consistent view data 556 from query engine 510 for a head node. In some embodiments, when cross-type query performance is enabled for a database, a network endpoint for both the database engine head node and data warehouse processing cluster may be provided for a client application to use as a target for sending queries (e.g., OLTP queries to the database engine head node and OLAP queries to the data warehouse processing cluster) which may both access the same data set in the same data store (e.g., log-structured storage service 350).

Different types of query plans may result from optimizing for performing queries across query engine types. FIG. 6 is a block diagram illustrating possible cross-type query engine plan optimizations, according to some embodiments. An initial query plan 610 may be generated for a query that assumes only use of the local query engine. Then, cross-type query engine optimization 620 may be applied to evaluate the initial query plan to determine which portions of a query can be performed by different types of query engines. However, in some scenarios, only a single type of query engine plan may be output from optimization 620. For example, local query execution type plan 632 may only utilize the initial query engine to receive the query (e.g., a database engine head node). This may occur because features included in the query may not be supported by the other query engine, or a predicted performance of the query at the local query engine may be better than the predicted performance achieved remotely. Alternatively, a remote query engine type plan 634 may be generated according to an evaluation that recognizes that performance of the query may be better if only performed on the remote query engine (although results may still be sent back to the local query engine before being passed to a client). A cross-type plan 636 could also be generated which utilizes both local and remote query engines, and thus includes local plan portions 642 and a remote plan 644.

Database service(s) 210 and data warehouse service(s) 230 may implement interface features to enable (and disable) performing queries across types of query engines for databases or warehouses hosted within these services. For example, database service 210 may implement cross-type query processing as a feature of a database instance that is deployed on behalf of a user when creating a new database in the service (or updating an existing database to the new database instance that includes this feature). In some embodiments, data warehouse service 230 may implement an interface to provision a serverless (e.g., fully managed) data warehouse cluster, which may be provided as an endpoint to handle queries to a database hosted by database service 210 via the cross-type query engine techniques discussed above (e.g., by allowing the data warehouse processing cluster to access the database volumes of a database in database service 210). For instance, the provisioned, requested, or deployed endpoint for the data warehouse processing cluster may be provided to a database instance of database service 210 to allow both the data warehouse processing cluster to access the database volume and to allow the database instance (e.g., via the database engine head node) to perform portions or all of queries sent to the database instance on the data warehouse processing cluster when more optimal for performance.

Figure 7:
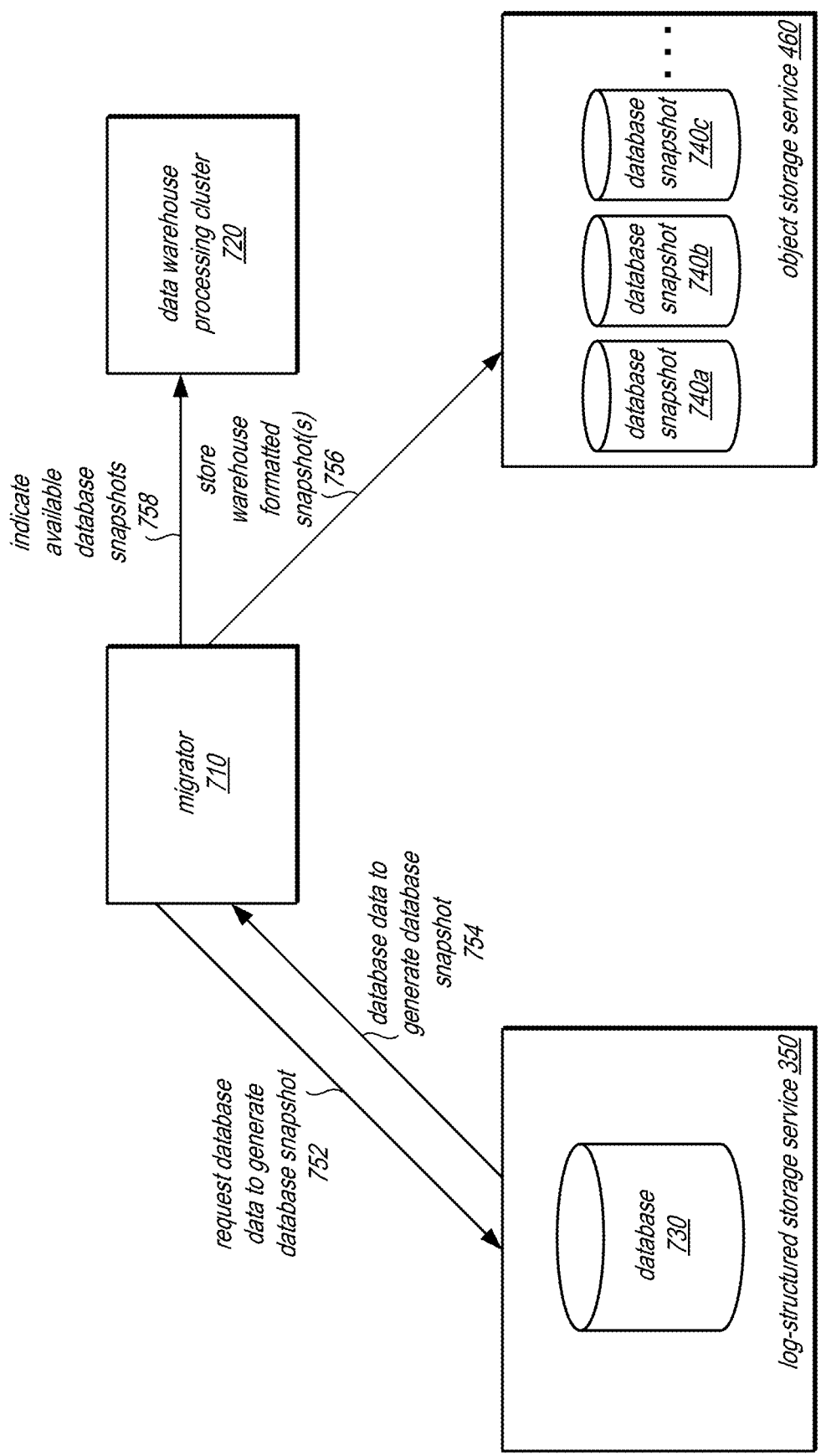
FIG. 7 is a block diagram illustrating a migrator that moves database data from one storage service to another storage service accessible to support performing queries to a consistent data set across query engine types, according to some embodiments.

As noted above, some cross type queries may take advantage of additional copies of a data set stored in another location, such as snapshots taken of a database. In this way, the retrieval and processing of external data at a data warehouse processing cluster can be speed up even further if the retrieval and processing work can be divided amongst additional retrieval nodes to access the data set stored in the other location. A database migrator may be implemented to facilitate the generation and storage of snapshots to support utilizing additional copies of a data set to perform a query across query engine types with a consistent view of the data set. FIG. 7 is a block diagram illustrating a migrator that moves database data from one storage service to another storage service accessible to support performing queries to a consistent data set across query engine types, according to some embodiments.

Migrator 710 may be implemented as a standalone service or provider network 200, or may be implemented as part of a database service 210 or data warehouse service 230. In some embodiments, migrator 710 may be deployed when cross type queries are enabled for a database instance or data warehouse cluster. Migrator 710 may request database data to generate a database snapshot 752 from log-structured storage service 350 (e.g., by request data pages or tuple streams of database 730). The database data may be returned 754 and migrator 710 may generate the snapshot. For instance, migrator 710 may reformat the database snapshot to be optimized for the data warehouse processing cluster (e.g., in column-oriented format). Migrator 710 may collect statistics or other features of the database snapshot which may be used to perform query planning and execution at data warehouse processing cluster 720.

Migrator 710 may store warehouse formatted snapshots 756, as respective database snapshot objects, such as database snapshots 740a, 740b, 740c, and so on, in object storage service 460. Migrator 701 may also provide an indication of available database snapshots 758 to data warehouse processing cluster 720 (e.g. by LSN associated with the snapshot) so that data warehouse processing cluster 720 can develop query plans to use database snapshots. A similar indication could be provided to a database engine head node (not illustrated) for similar query planning purposes.

Migrator 710 may be configured by a user interface (e.g., graphical, command line or programmatic) to generate snapshots according to various rules or criteria that trigger snapshot generation events. For example, when a migrator 710 is deployed for a database instance with cross type query performance enabled, the user interface may expose options to a user to define time periods for generating snapshots, or amounts of change to a database that trigger generating a snapshot.

Figure 8:
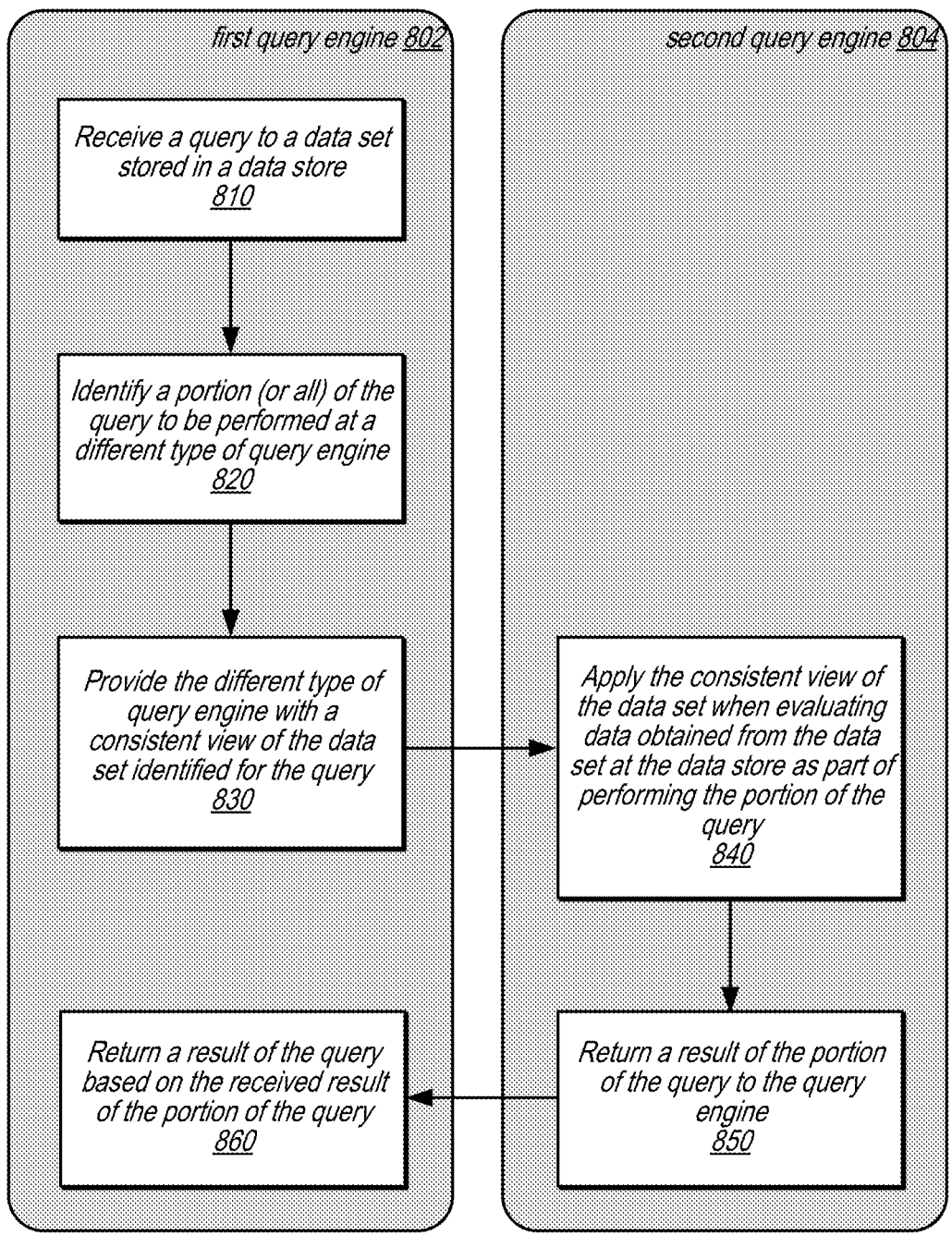
FIG. 8 is a high-level flow chart illustrating methods and techniques for performing queries to a consistent data set across query engine types, according to some embodiments.

The various provider network services discussed in FIGS. 2 through 7 provide examples of a system that may perform queries to a consistent data set across query engine types. However, various other types of query engines (e.g., non-relational), data stores (e.g., non-log structured) or other architectures or environments may implement performing queries to a consistent data set across query engine types. FIG. 8 is a high-level flow chart illustrating methods and techniques for performing queries to a consistent data set across query engine types, according to some embodiments. Various different systems and devices may implement the various methods and techniques described below, either singly or working together. For example, a database engine head node or storage node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

Different types of query engines may be implemented that can access a same data set stored in a same data store. For example, first query engine 802 and second query engine 804 may support different query languages, different operations, different underlying data formats, or other differences and yet may also perform queries across the two different query engines. For instance, as indicated at 810, a query to a data set stored in a data store may be received at first query engine 802, in some embodiments. The query may be formatted according to a query language or features supported by first query engine 802 or may include or be formatted according to a query language or features supported by second query engine 804.

As indicated at 820, a portion (or all) of the query may be identified to be performed at a different type of query engine, in some embodiments. For example, the different features, operations, or language of the second query engine 804 may be recognized by a parser, optimizer, or other query engine component. In some embodiments, query hints may identify sections of queries and a corresponding type of query engine to be used instead of the receiving query engine. In some embodiments, cost estimations or predications may be used to weight alternative query plans, including plans that implement different query engine types, in order to select a plan according to the estimated performances of the plans.

As indicated at 830, a consistent view of the data asset identified for the query may be provided to the different type of query engine, in some embodiments. For example, a consistent view of the database may be assigned according to an arrival time of the query at first query engine 802 (e.g., represented by a timestamp or LSN). The consistent view may be indicated to second query engine 804 as part of a request to perform the portion of the query, in some embodiments. The consistent view may be provided by sending, copying, or transferring undo or other information used to generate versions of data in the data consistent with the consistent view of the database (e.g., a value of the data at the same time as of the consistent view, in some embodiments.

As indicated at 840, the consistent view of the data set may be applied when evaluating data obtained from the data set at the data store as part of performing the portion of the query, in some embodiments. For example, as data is obtained that is not consistent with the consistent view, then the consistency information may be used to generate a value of the data that is consistent with the consistent view. A result of the portion of the query may be returned to the query engine, as indicated at 850, in some embodiments. A result of the query based on the received result of the portion of the query may be returned, in some embodiments. For example, the result may be used to join or filter data obtained by first query engine 802 to produce a final result.

Figure 9:
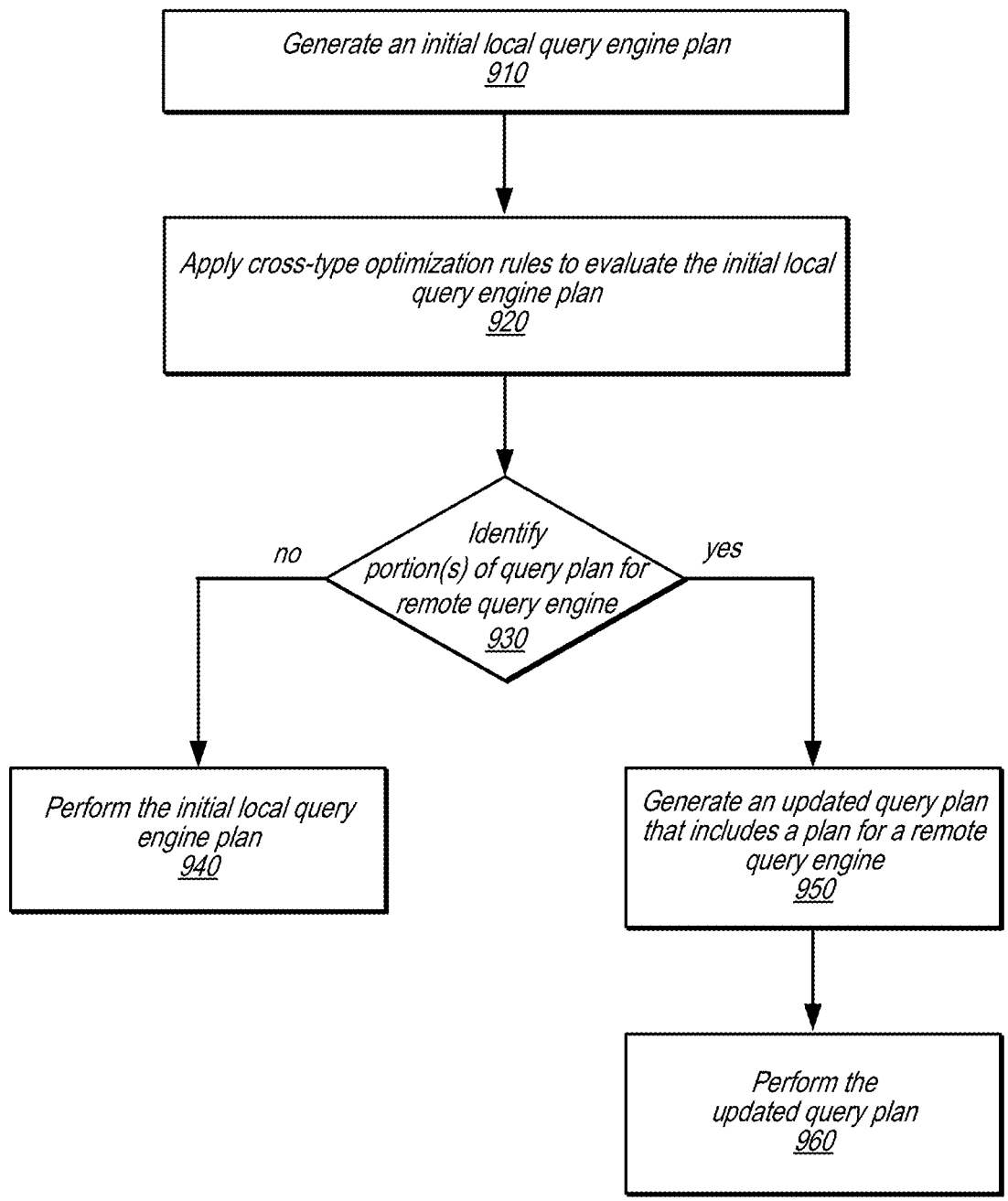
FIG. 9 is a high-level flow chart illustrating methods and techniques for generating a query plan for performing queries to a consistent data set across query engine types, according to some embodiments.

FIG. 9 is a high-level flow chart illustrating methods and techniques for generating a query plan for performing queries to a consistent data set across query engine types, according to some embodiments. As indicated at 910, an initial local query engine plan may be generated, in some embodiments, for a query received at a query engine. For example, various parsing, analyzing, and optimizing rules may be applied to generate the initial local query plan as if no other query engine were available to perform the query.

As indicated at 920, cross-type optimization rules may be applied to evaluate the initial local query engine plan, in some embodiments. In this way, portion(s) of the query plan may be identified for a remote query engine instead of the local query engine, as indicated at 930. Cross-type optimization rules can be dependent upon the supported features and characteristics of the local and remote query engines under consideration. For example, short queries (e.g., identifying a small number of records or individual records in a data set) may be identified for local query processing if the local query engine is an OLTP type of query engine, whereas queries that involve a large number of records may be OLAP queries and beneficially performed on a remote query engine that is an OLAP type of query engine.

Cross-type optimization rules may include supported languages, features, operations, hints, or other information specific to each query engine type. Estimation techniques for each query engine type to perform plan analysis may be implemented, including machine-learning based performance estimation models that can take as input the features of the initial query plan and classify portions of the query plan for the different types of query engines according to a machine learning model (e.g., a classification technique that utilizes a feature vector based comparison of a feature vector generated for a query). Selection between features supported by both query engine types may be handled according to performance estimates or models for the features maintained for each query engine type (e.g., in order to select the more performant query engine type). Query hints, database statistics, or other information that can influence the prediction or selection of operations in a query plan, and thus the query engine type that may perform them, may also be considered by cross-type optimization rules.

If no portions of the query are identified for remote performance, then the initial local query engine plan may be performed, as indicated at 940. However, if portions of the query plan are identified for a remote query engine, then an updated query plan that includes a plan for the remote query engine may be generated as indicated at 950. For example, the plan may be query in a language or format supported by the remote query engine which the remote query engine can parse and optimize to generate its own query plan). The remote query plan portion may include operators or instructions understandable by the remote query engine (e.g., similar to an output of a planner/optimizer at the remote query engine) to begin performance of the identified portion. The plan may include operations to provide additional metadata and/or consistency information to the remote query engine, as discussed above with regard to FIG. 5, in some embodiments. Then as indicated at 960, the updated query plan may be performed by the local query engine, which may include directing various operations and requests to the remote query engine, combining or forwarding results from the remote query engine, among other query plan operations, in some embodiments.

Figure 10:
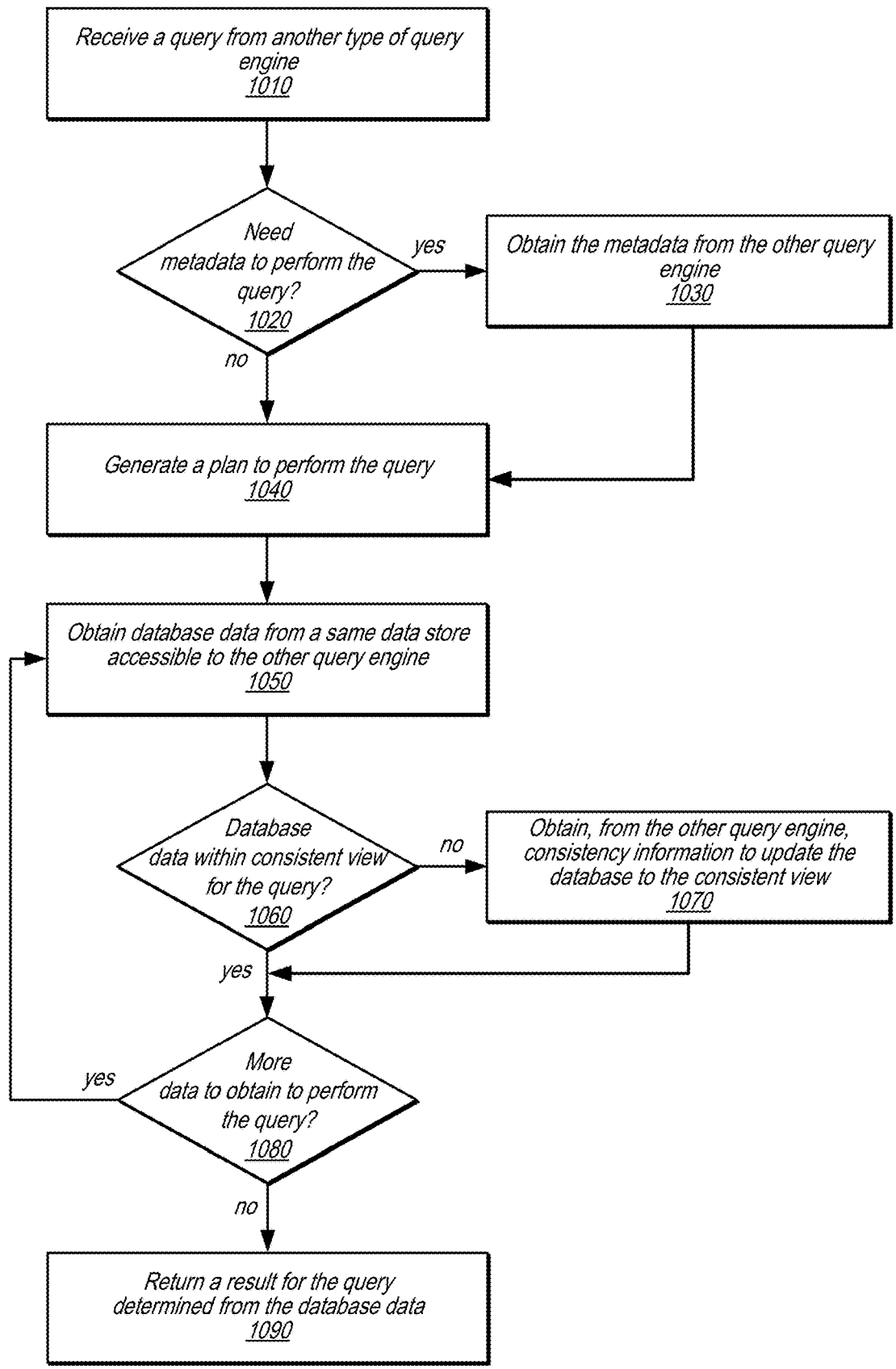
FIG. 10 is a high-level flow chart illustrating methods and techniques for applying a consistent view of a data set to perform queries to a consistent data set across query engine types, according to some embodiments.

FIG. 10 is a high-level flow chart illustrating methods and techniques for applying a consistent view of a data set to perform queries to a consistent data set across query engine types, according to some embodiments. As indicated at 1010, a query may be received from another type of query engine, in some embodiments. The query may be represented according to a query language, protocol, API, or other format supported by the query engine, including a query plan.

A determination may be made as to whether the metadata is needed to perform the query, as indicated at 1020, in some embodiments. For example, logical sequence numbers (LSN) indicating the consistent view point of the database for the query, storage/head node connection info, schema, available statistics, among other metadata may be provided. If one or more portions of needed (or desirable) to generate a plan (or execute a plan) to perform the query is identified, then as indicated at 1030, the metadata may be obtained form the query engine, in some embodiments. For example, an API request or other interface may be used to request and receive specific metadata (or all available metadata) from the other query engine.

As indicated at 1040, plan to perform the query may be generated, in some embodiments. If a plan was received as the query, then a physical plan (e.g., identifying which storage nodes, data pages or blocks, etc.) may be generated.

If the query was received as query statement, then a logical plan (e.g., including various query plan operations, such as scans, joins, etc.) and then a physical plan may be generated.

As indicated at 1050, database data may be obtained from a same data store as accessible to the other query engine, in various embodiments. For example, the data retrieval nodes of data retrieval service 450 as discussed above in FIG. 4 may be used, or other types of data reading or scanning techniques may be implemented. In addition to the data from the same data store, other copies of the data set may be used (e.g., snapshots stored in another data store) to supplement or reduce time to scan the data for performing the query, in some embodiments. As indicated at 1060, a check may be made as to whether the obtained data is within the consistent view of the data set for the query, in some embodiments. For example, an LSN or timestamp value associated with the consistent view may be compared with an LSN or timestamp associated with a data page (or value with the data page). If the LSN/timestamp for the page is later than the LSN/timestamp value for the consistent view, then the data is not consistent. As indicated at 1070, consistency information may be obtained from the other query engine to update the database to the consistent view, in some embodiments. For example, undo log records for the data page (or value within the data page) may be returned to the query engine.

Performance of the query may continue, as indicated by the positive exit from 180 until no more data remains to be obtained. The query engine may perform various evaluations and operations as specified by the query and return a result for the query determined from the database data 1090 (including the updated database data), in various embodiments.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

FIG. 11 is a block diagram illustrating a computer system that may implement at least a portion of the systems described herein, according to various embodiments. For example, computer system 2000 may implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 660, as desired, and may retrieve the stored instruction and/or data as needed. For example, in some embodiments, computer system 2000 may host a storage node, and persistent storage 2060 may include the SSDs attached to that server node.

Computer system 2000 includes one or more system memories 2020 that may store instructions and data accessible by processor(s) 2010. In various embodiments, system memories 2020 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein for performing queries to a consistent data set across query engine types. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node, nodes of a data warehouse processing cluster, a migrator, storage nodes of a storage service, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be implemented as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 20 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a first one or more processors and a first memory that implement a storage node that stores a common copy of data for a database in a common format;
 a second one or more processors and a second memory that implement an Online Transaction Processing (OLTP) type of query engine for the common copy of the data of the database stored in the common format at the data node, wherein the OLTP type of query engine is communicatively coupled to the storage node via a first network connection;
 a third one or more processors and a third memory that implement an Online Analytical Processing (OLAP) type of query engine for the common copy of the data of the database stored in the common format at the data node, wherein the OLAP type of query engine is communicatively coupled to the storage node over a second network connection different from the first network connection;
 the OTLP type of query engine, configured to:
  receive a query to the database;
  identify at least a portion of the query to be performed at the OLAP type of query engine;
  determine a consistent view of a data set of the database applicable to the query, the consistent view comprising one or more changes to the common copy of the data of the data set stored on the storage node;
  send a request to the OLAP type of query engine to perform the portion of the query; and
  provide the OLAP type of query engine with the consistent view of the data set applicable to the query;
 the OLAP type of query engine, configured to:
  obtain, responsive to receipt of the request to perform the portion of the query, the common copy of the data of the data set in the common format from the storage node via the second network connection, the obtained data comprising a current value not within the consistent view of the data set;
  apply the one or more changes of the consistent view of the data set provided by the OLTP query engine when evaluating the obtained data of the database as part of performing the portion of the query on the consistent view of the database; and
  return a result of the portion of the query to the OLTP query engine; and
 the OTLP type of query engine, further configured to:
  return a final result of the query based, at least in part, on the result received from the OLAP type of query engine.

2. The system of claim 1, wherein to identify the portion of the query to be performed at the OLAP type of query engine, the OLTP type of query engine is configured to:
 generate an initial local query engine plan;
 apply one or more cross-type optimization rules to evaluate the initial local query engine plan; and
 generate an updated query plan that includes a plan for performing the portion of the query at the second query engine, wherein the OLTP type of query engine performs the updated query plan.

3. The system of claim 1,
 wherein to provide the OLAP type of query engine with the consistent view of the data set identified for the query, the OLTP query engine is configured to send to the OLAP type of query engine, one or more undo log records applicable to an item of the data obtained for performing the portion the query; and
 wherein to apply the consistent view of the data set provided by the OLTP type of engine when evaluating data of the database obtained from the storage node as part of performing the portion of the query the OLAP type of query engine is configured to apply the one or more undo log records to determine a different value of the item of the data to evaluate as part of performing the portion of the query.

4. The system of claim 1, wherein the OLTP type of query engine is implemented as part of a database service of a provider network, wherein the OLAP type of query engine is implemented as part of a data warehouse service of a provider network, and wherein prior to the receipt of the query, performance of queries across the OLTP type of query engine and the OLAP type of query engine is enabled responsive to a request received via an interface implemented as part of the provider network.

5. A method, comprising:
 receiving, at a first query engine, a query to a data set stored in a common format in a data store wherein the first query engine is communicatively coupled to the data store via a first network connection;
 identifying, by the first query engine, at least a portion of the query to be performed at a second query engine that is a different type of query engine than the first query engine, wherein the first query engine and second query engine provide query processing for the data set stored in the common format in the data store, and wherein the second query engine is communicatively coupled to the data store over a second network connection different from the first network connection;
 determining a consistent view of the data set comprising one or more changes to data of the data set stored in the data store;
 providing, by the first query engine, the second query engine with the consistent view of the data set identified for the query;

applying, by the second query engine, the one or more changes of the consistent view of the data set provided by the first query engine when evaluating data obtained from the data set in the common format at the data store, via the second network connection, as part of performing the portion of the query, the obtained data comprising a current value not within the consistent view of the data set; and returning, by the first query engine, a result of the query based, at least in part, on a result of performing the portion of the query at the second query engine.

6. The method of claim 5,
wherein providing the second query engine with a consistent view of the data set identified for the query comprises sending, to the second query engine, one or more undo log records applicable to an item of the data obtained for performing the portion the query; and
wherein applying the consistent view of the data set provided by the first query engine when evaluating data obtained from the data set at the data store as part of performing the portion of the query comprises applying the one or more undo log records to determine a different value of the item of the data to evaluate as part of performing the portion of the query.

7. The method of claim 5, further comprising:
identifying, by the second query engine, metadata for performing the portion of the query; and
obtaining, by the second query engine, the metadata for performing the portion of the query from the first query engine.

8. The method of claim 5, further comprising:
causing, by the second query engine, the data of the data set for performing the portion of the query to be obtained from the data store and reformatted into a data format supported by the second query engine before evaluating the data as part of performing the portion of the query.

9. The method of claim 5, further comprising:
obtaining, by the second query engine, additional data for performing the portion of the query from a snapshot of the data set stored in another data store; and
evaluating, by the second query engine, the additional data as part of performing the portion of the query to include as part of the result of the portion of the query sent to the first query engine.

10. The method of claim 5, further comprising:
accessing, by the first query engine, the data set in the data store to obtain data for performing another portion of the query; and
combining, by the first query engine, a result of performing the other portion of the query with the result of performing the portion of the query at the second query engine to generate the result of the query that is returned.

11. The method of claim 5, wherein identifying the at least the portion of the query to be performed at the second query engine that is the different type of query engine than the first query engine comprises:
generating an initial local query engine plan;
applying one or more cross-type optimization rules to evaluate the initial local query engine plan; and
generating an updated query plan that includes a plan for performing the portion of the query at the second query engine.

12. The method of claim 5, further comprising:
receiving, at the second query engine, a second query directed to the data set, wherein the second query is received from a source different than the first query engine;
applying, by the second query engine, a consistent view of the data set provided by the first query engine when evaluating data obtained from the data set at the data store as part of performing the second query; and
returning, by the second query engine, a result of performing the second query to the source.

13. The method of claim 5, wherein returning the result of the query based, at least in part, on the result of performing the portion of the query at the second query engine comprises receiving and forwarding the result of performing the portion of the query at the second query engine.

14. One or more non-transitory, computer-readable storage media, storing program instructions that when executed on or across one or more computing devices cause the one or more computing devices to implement a first query engine that implements:
receiving a query to a data set stored in a common format in a data store communicatively coupled to the first query engine via a first network connection;
identifying, by the first query engine, at least a portion of the query to be performed at a second query engine that is a different type of query engine than the first query engine, wherein the first query engine and second query engine provide query processing for the data set stored in the common format in the data store, and wherein the second query engine is communicatively coupled to the data store over a second network connection different from the first network connection;
determining a consistent view of the data set comprising one or more changes to data of the data set stored in the data store;
sending a request to the second query engine to perform the portion of the query;
providing the second query engine with the consistent view of the data set identified for the query;
receiving, from the second query engine, a result from the portion of the query determined from an evaluation of data obtained from the data set in the common format at the data store via the second network connection that applied the one or more changes of the consistent view of the data set as part of performing the portion of the query, the obtained data comprising a current value not within the consistent view of the data set; and
returning a final result of the query based, at least in part, on the result received from the second query engine.

15. The one or more non-transitory, computer-readable storage media of claim 14, wherein, in identifying the at least the portion of the query to be performed at the second query engine that is the different type of query engine than the first query engine, the program instructions cause the first query engine to implement:
generating an initial local query engine plan;
applying one or more cross-type optimization rules to evaluate the initial local query engine plan; and
generating an updated query plan that includes a plan for performing the portion of the query at the second query engine.

16. The one or more non-transitory, computer-readable storage media of claim 14, further comprising additional program instructions that when executed by the one or more computing devices cause the first query engine to further implement:

receiving, from the second query engine, a request for metadata for performing the query at the second query engine; and sending, to the second query engine, the requested metadata for performing the query.

17. The one or more non-transitory, computer-readable storage media of claim 14, wherein, in providing the second query engine with the consistent view of the data set identified for the query, the program instructions cause the first query engine to implement:

providing to the data store an indication of the consistent view of the data set to be provided to the second query engine, wherein the data store applies one or more undo log records to one or more items of the data obtained by the second query engine.

18. The one or more non-transitory, computer-readable storage media of claim 14, further comprising additional program instructions that when executed by the one or more computing devices cause the first query engine to further implement:

receiving a network endpoint for the second query engine as part of enabling cross-type query performance at the first query engine, wherein the request to perform the portion of the query is sent to the network endpoint.

19. The one or more non-transitory, computer-readable storage media of claim 14, further comprising additional program instructions that when executed by the one or more computing devices cause the first query engine to further implement:

accessing the data set in the data store to obtain data for performing another portion of the query; and combining a result of performing the other portion of the query with the result received from the second query engine to generate the final result.

20. The one or more non-transitory, computer-readable storage media of claim 14, wherein the first query engine is implemented as part of a first network-based service of a provider network, wherein the second query engine is implemented as part of a second network-based service of the provider network, and wherein the data store that stores the data set is a storage service of the provider network.

* * * * *